(12) United States Patent
Jen-Yu et al.

(10) Patent No.: US 7,260,042 B2
(45) Date of Patent: Aug. 21, 2007

(54) GENERATING TRACKING CONTROL OUTPUT SIGNALS FOR COMPENSATING TRACKING ERROR SIGNALS

(75) Inventors: Hsu Jen-Yu, Hsinchu (TW); Fu Hsiang-Yi, Hsinchu (TW); Lee Tun-Chieh, Hsinchu (TW); Chen Fu-Hsiang, Hsinchu (TW); Tsai Yao-Chou, Hsinchu (TW)

(73) Assignee: Lite-On IT Corporation, Taipei (TW)

( * ) Notice: Subject to any disclaimer, the term of this patent is extended or adjusted under 35 U.S.C. 154(b) by 520 days.

(21) Appl. No.: 10/865,479

(22) Filed: Jun. 9, 2004

(65) Prior Publication Data
US 2005/0007903 A1    Jan. 13, 2005

(30) Foreign Application Priority Data
Jul. 9, 2003    (CN) .............................. 92 1 18656

(51) Int. Cl.
*G11B 7/005*    (2006.01)
(52) U.S. Cl. .............................. 369/53.23; 369/53.28; 369/44.29
(58) Field of Classification Search ............. 369/53.23, 369/44.29, 53.28
See application file for complete search history.

(56) References Cited

U.S. PATENT DOCUMENTS

| | | | | |
|---|---|---|---|---|
| 5,905,703 | A * | 5/1999 | Osada ................... | 369/44.41 |
| 6,388,963 | B1 * | 5/2002 | Tanaka .................. | 369/44.26 |
| 2001/0002893 | A1 * | 6/2001 | Ohshita et al. ......... | 369/44.28 |

* cited by examiner

*Primary Examiner*—Wayne Young
*Assistant Examiner*—Thomas Alunkal
(74) *Attorney, Agent, or Firm*—Thomas, Kayden, Horstemeyer & Risley

(57) ABSTRACT

The present disclosure provides systems and methods for tracking of control and error signals in optical disk drives. Successive square waves are generated as a tracking control output signal, and a tracking error signal is generated as a function of both the tracking control output signal and an offset correction factor. Due to the characteristics of the square wave, more reliable tracking is possible by the use of the square wave.

3 Claims, 5 Drawing Sheets

(a)

(b)

GENERATING TRACKING CONTROL OUTPUT SIGNALS FOR COMPENSATING TRACKING ERROR SIGNALS

FIELD OF INVENTION

The present disclosure generally relates to optical disk drives and, more particularly, to tracking of control and error signals in optical disk drives.

BACKGROUND

As shown in FIG. 1(a), an optical disk 2 comprises lands 6 and grooves 4 that contain recorded information. Optical disk drives read and write data from optical disks 2 by irradiating the optical disk with a laser. Due to the different reflection characteristics between the lands 6 and grooves 4, the content of the information written on the optical disk 2 may be determined by the different reflection characteristics.

The size of the lands 6 and grooves 4 on the optical disk 2 are fairly small. Thus, in order to properly read data from, and write data to, optical disks, the laser is focused on a particular track. The focusing and tracking of the laser often involves processes for generating and detecting tracking error signals.

In an example optical pickup module 1, as shown in FIG. 2, an optical pickup 3 is coupled to a sled 7 and a spring 5. As is known, the force on the spring 5 is controlled by a tracking control output signal. The controlled force on the spring 5 affects movement of theoptical pickup 3, thereby positioning the optical pickup 3 at a position dictated by the tracking control output signal. Since the movement of the optical pickup 3 is well known in the art, further discussion of the sled 7 movement is omitted here.

Several well-known processes for controlling the movement of the optical pickup 3 are the push-pull method and the three-beam method. Since both of these processes are well-known in the art, only a cursory discussion of these processes is provided here.

As illustrated in FIG. 1(b), in the push-pull process, when the laser beam is focused on a track 8, the difference between the light returned from the disc on both sides of the track 10, 12 may be measured. When the laser beam is centered exactly over the track 8, the difference between the light reflected from one side 10 of the disc and the light reflected from the other side 12 of the disc is zero. However, when the beam is off center, the push-pull tracking then becomes positive or negative.

In the three-beam method, the laser beam is divided into three beams, one of which follows the track under consideration (i.e., the central track), while the other two are focused on adjacent tracks (i.e., outriggers), immediately before and after the desired track. Any movement of the central track away from its desired position will cause an increase in the signal from one of the outriggers and, simultaneously, a decrease in the signal from the other outrigger. A comparison of the two outrigger signals provides sufficient information for a track-following servo.

As is known in the art, the tracking error signal is generated during the tracking process for indicating the deviation between a track position and the position of the optical pickup 3. However, when the offset is included in the tracking error signal, a deviation corresponding to the offset is induced between the track position and the position of the optical pickup 3. Moreover, in an optical disk drive adapted for counting the number of tracks that laser beams traverse based on the tracking error signal, if any offset exists in the tracking error signal as described above, it is impossible to precisely count the number of tracks. Thus, the process of removing the offset from the tracking error signal is carried out before reproducing/recording the information recorded on the disk. (i.e. compensating the tracking error signal)

When the push-pull method and the three-beam method are combined, the offset of the tracking error signal (TE) is a function of a main-push-pull-signal offset (MPP), which represents the signal from the central track, a sub-push-pull-signal offset (SPP), which represents the signal from one of the outriggers, and an offset correction factor (A). In other words, the TE may be represented as:

$$TE=MPP+(A*SPP) \qquad [\text{Eq. 1}].$$

As shown in FIG. 3, a conventional optical disk drive produces TE by introducing a tracking control output signal (TC) 9, which is typically a sine wave. The offset correction factor (A) is recursively altered during consecutive time intervals 25, 27, 29, thereby providing an iterative approach to compensating TE. Unfortunately, the shape of the sine wave sometimes produces erroneous TE.

Thus, a heretofore-unaddressed need exists in the industry to address the aforementioned deficiencies and inadequacies.

SUMMARY

The present disclosure provides systems and methods for tracking of control and error signals in optical disk drives. In some embodiments, successive square waves are generated as a tracking control output signal. A tracking error signal is generated as a function of an offset correction factor and, also, as a function of the tracking control output signal.

Other systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
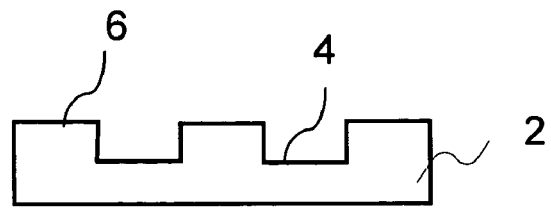
FIG. 1A is a cross-sectional view of a conventional recording disk.
FIG. 1B is a top view of a laser light beam reflected and diffracted at the recording disk.
Figure 1:
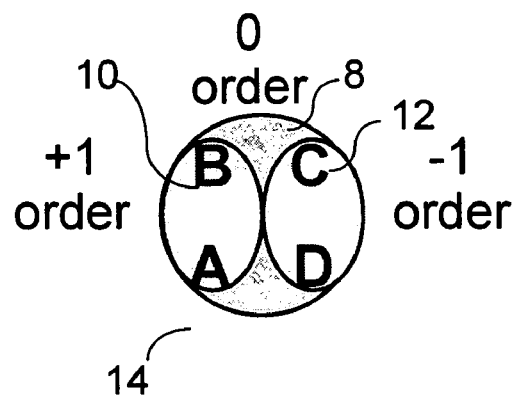
Figure 2:
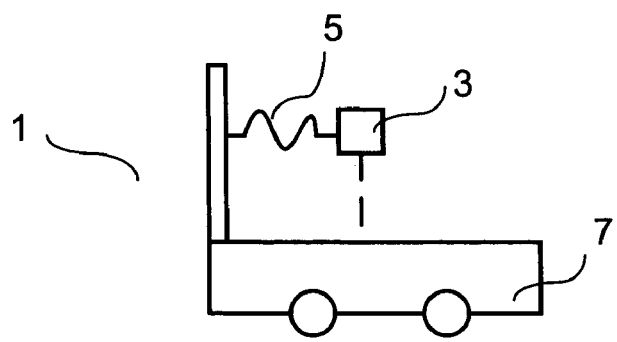
FIG. 2 is a drawing showing an optical pickup module.
Figure 3:
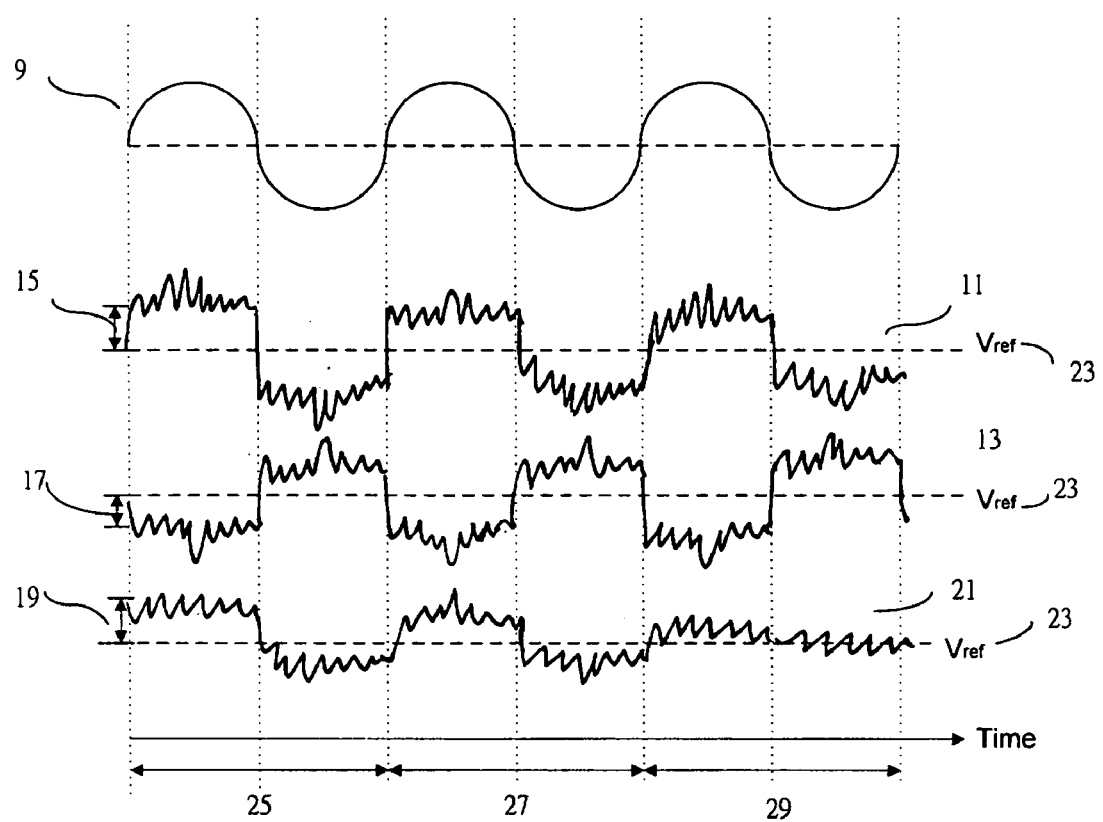
FIG. 3 is a graph showing a sine-wave tracking control output signal of the prior art.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

Figure 4:
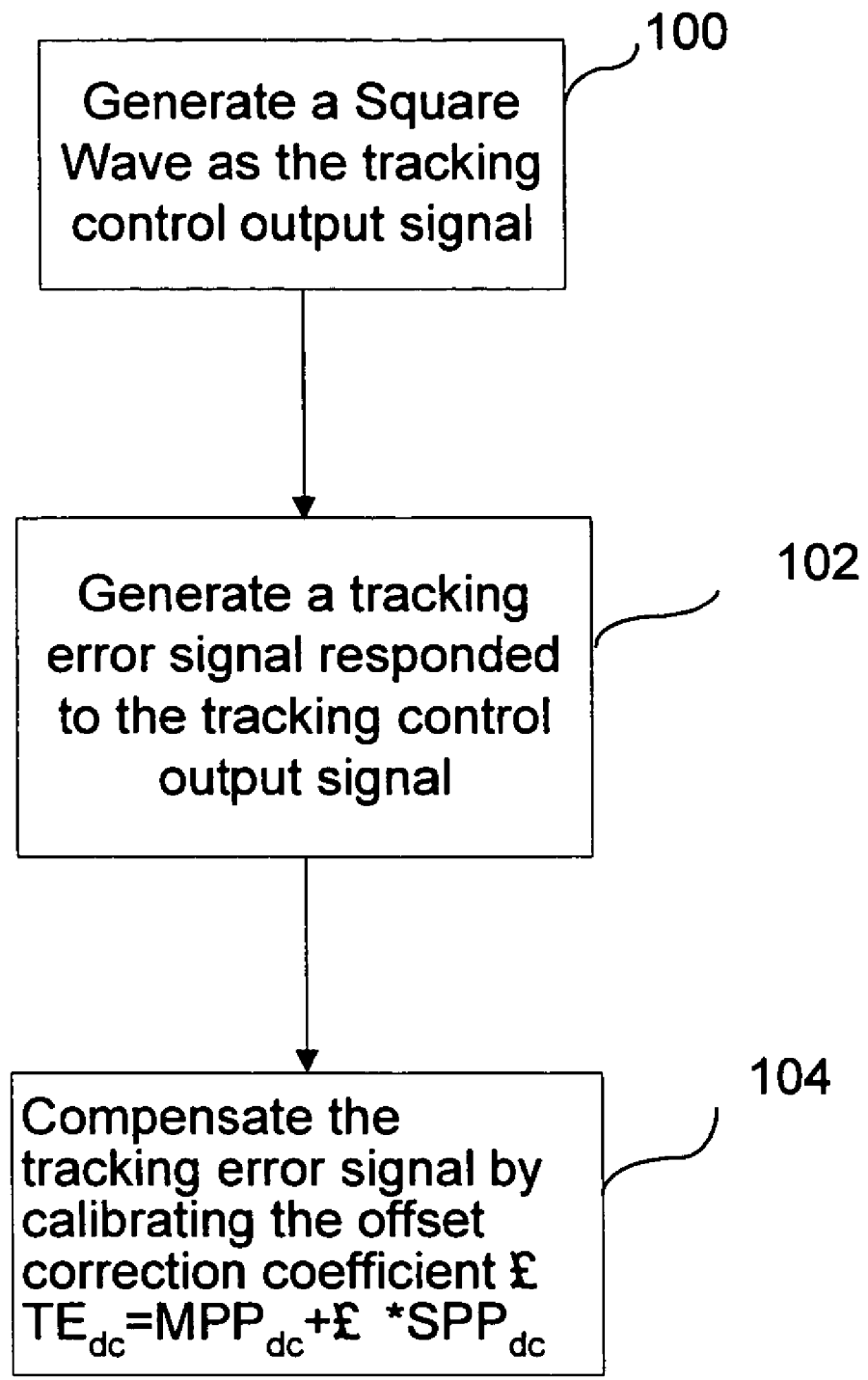
FIG. 4 is a flowchart showing an embodiment of a process for compensating a tracking error signal.
Figure 5:
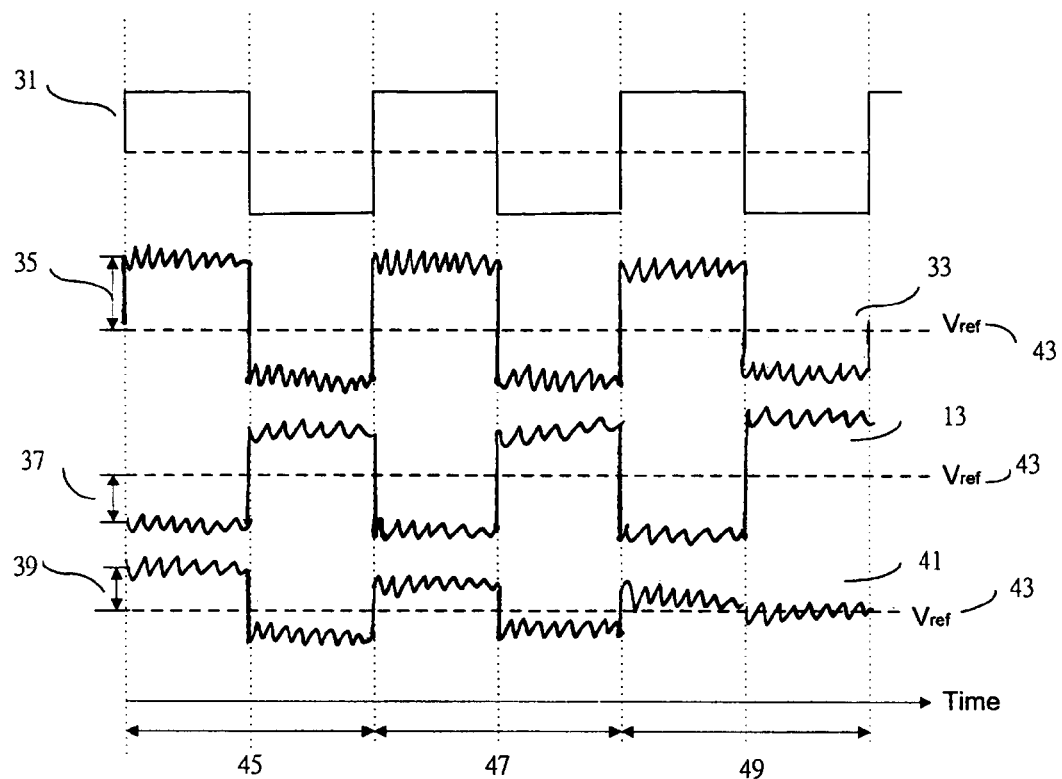
FIG. 5 is a graph showing an embodiment of a square-wave tracking control output signal.
Figure 6:
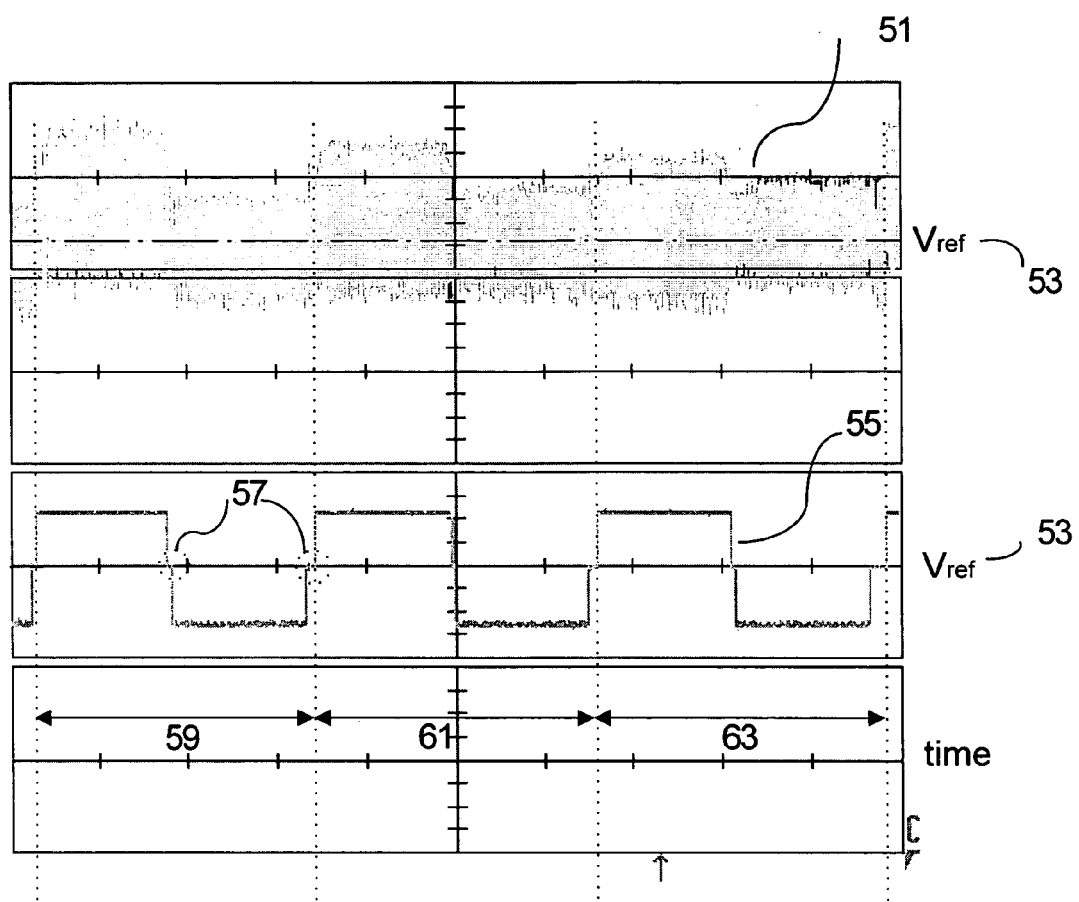
FIG. 6 is a graph showing another embodiment of a square-wave tracking control output signal.

While sine waves are typically used to as tracking control signals in optical disk drives, the inherent characteristics of sine waves sometimes produce erroneous results during tracking in optical disk drives. By using square waves, rather than sine waves, as tracking control signals, more reliable tracking is possible due to the inherent characteristics of square waves. FIGS. 4 through 6 show several embodiments in which the tracking control is improved by the use of square waves.

FIG. 4 is a flowchart showing an embodiment of a process for compensating a tracking error signal in an optical disk drive. As shown in FIG. 4, some embodiments of the process may be seen as comprising the steps of generating (100) a square pulse, generating (102) a tracking error signal, and compensating (104) for the tracking error. In some embodiments, the tracking error signal has an offset that is a function of both the square pulses and an offset correction coefficient. In other words, the offset of the tracking error signal (TEo) may be represented as:

$$TEo = MPPo + (A*SPPo) \quad [Eq.\ 2],$$

wherein MPPo is an offset of a main push-pull signal, SPPo is an offset of a sub-push-pull signal, and A is the offset correction coefficient. The offset of the tracking error signal is adjusted by altering the offset correction coefficient, A. These steps (100, 102, 104) may be recursively performed in order to adequately calibrate the tracking of an optical disk drive. In some embodiments, these steps (100, 102, 104) may be performed in a system that calibrates tracking error using a combination of a push-pull method and a three-beam method.

FIG. 5 is a graph showing an embodiment of a square-wave tracking control output signal. As shown in FIG. 5, a square wave 31 is used as the tracking control output signal. The tracking error signal 41 is then generated as a function of the square wave 31 and an offset correction coefficient. Additionally, FIG. 5 shows a main push-pull signal (MPP) 33 and a sub-push-pull signal (SPP) 51, which are also used, in some embodiments, to generate the tracking error signal 41. For those embodiments, the tracking error signal 41 is the superposition of MPP 33 and SPP 51. As shown in FIG. 5, the offset levels in the period 45 and period 47 are not at the reference voltage level (Vref) 43. However, after the calibration of the offset correction coefficient (A), the tracking error signal 41 in the period 49 settles to Vref 43. Because the present invention adopts square pulses, rather than a sine wave, as the tracking control output signal, greater reliability is achieved in calibrating the tracking of the optical disk drive.

FIG. 6 is a graph showing another embodiment of a square-wave tracking control output signal. Specifically, FIG. 6 shows a simulation of a square-wave tracking control output signal that is used to calibrate the tracking of the optical disk drive. As shown in FIG. 6, the tracking error signal 51 is generated as a function of the tracking control output signal 55. By recursively altering an offset correction coefficient (A), the tracking error signal in period 63 settles at the reference voltage level (Vref) 53. As shown in FIG. 6, each half period of the square pulses 55 may be interposed by a time interval. Thus, the square pulses in FIG. 6 exhibit a step-like characteristic in which positive square pulses and negative square pulses are separated by intervening plateaus. The plateau may become useful in cases where the response time of generating the tracking error signal by the servo apparatus is too long. As shown in the simulation of FIG. 6, the square pulses are also coupled with high-frequency components that stem from the operating environment.

Although exemplary embodiments have been shown and described, it will be clear to those of ordinary skill in the art that a number of changes, modifications, or alterations to the invention as described may be made. All such changes, modifications, and alterations should therefore be seen as within the scope of the disclosure.

What is claimed is:

1. A tracking method in an optical disk drive, the tracking method comprising the steps of:
   generating a positive square pulse;
   generating a negative square pulse;
   separating the positive square pulse from the negative square pulse by a time interval;
   generating a tracking error signal having an offset, the offset of the tracking error signal being a function of the said square pulses, the offset of the tracking error signal further being a function of an offset correction coefficient; and
   adjusting the offset of the tracking error signal by altering the offset correction coefficient.

2. A method of generating a tracking control output signal for the purpose of compensating a tracking error signal used in an optical disk drive, the method comprising the steps:
   generating a plurality of successive square waves as the said tracking control output signal, wherein the successive square waves consisting a non-continuous period between every half period;
   generating the said tracking error signal responded to the said tracking control output signal; and compensating the said tracking error signal by calibrating an offset correction coefficient.

3. A method of generating a tracking control output signal for the purpose of compensating a tracking error signal used in an optical disk drive, the method comprising the steps:
   generating a plurality of successive square waves as the said tracking control output signal, wherein the successive square waves consisting a non-continuous period between every half period;
   generating the said tracking error signal responded to the said tracking control output signal, wherein the offset of the tracking error
   signal (TEo) is:
   TEo=MPPo+(A*SPPo),
   wherein:
   MPPo is an offset of a main push-pull signal;
   SPPo is an offset of a sub-push-pull signal; and
   A is the offset correction coefficient.

* * * * *